US012633872B2

(12) United States Patent
Kunz et al.

(10) Patent No.: US 12,633,872 B2
(45) Date of Patent: May 19, 2026

(54) OUTDOOR PHOTOLUMINESCENCE IMAGING OF PHOTOVOLTAIC ARRAYS VIA OPTICAL STRING MODULATION

(71) Applicant: NEWSOUTH INNOVATIONS PTY LIMITED, Sydney (AU)

(72) Inventors: Oliver Kunz, Sydney (AU); Germain Antoine Rey, Sydney (AU); Thorsten Trupke, Sydney (AU); Mattias Juhl, Sydney (AU)

(73) Assignee: NEWSOUTH INNOVATIONS PTY LIMITED, Sydney (AU)

( * ) Notice: Subject to any disclaimer, the term of this patent is extended or adjusted under 35 U.S.C. 154(b) by 218 days.

(21) Appl. No.: 18/570,848

(22) PCT Filed: Jun. 17, 2022

(86) PCT No.: PCT/AU2022/050607

§ 371 (c)(1),
(2) Date: Dec. 15, 2023

(87) PCT Pub. No.: WO2022/261719

PCT Pub. Date: Dec. 22, 2022

(65) Prior Publication Data

US 2024/0283402 A1      Aug. 22, 2024

(30) Foreign Application Priority Data

Jun. 18, 2021    (AU) ................................. 2021901847

(51) Int. Cl.
H02S 50/15        (2014.01)
G01N 21/64        (2006.01)
G01N 21/88        (2006.01)

(52) U.S. Cl.
CPC ......... H02S 50/15 (2014.12); G01N 21/6456 (2013.01); G01N 21/6489 (2013.01);
(Continued)

(58) Field of Classification Search
CPC ... G01N 2021/8809; G01N 2021/8835; G01N 21/6456; G01N 21/6489; G01N 21/88;
(Continued)

(56) References Cited

U.S. PATENT DOCUMENTS

| | | |
|---|---|---|
| 11,888,439 B2 * | 1/2024 | Viotto ..................... H02S 40/36 |
| 2013/0314118 A1 | 11/2013 | Mak et al. |
| 2018/0262159 A1 | 9/2018 | Deceglie et al. |

FOREIGN PATENT DOCUMENTS

| | | |
|---|---|---|
| EP | 3767825 A1 | 1/2021 |
| WO | 2016118975 A1 | 7/2016 |

(Continued)

OTHER PUBLICATIONS

International Search Report and Written Opinion in Application No. PCT/AU2022/050607, mailed Jul. 29, 2022, 8 pages.

(Continued)

*Primary Examiner* — Tri T Ton
(74) *Attorney, Agent, or Firm* — Meunier Carlin & Curfman LLP

(57) ABSTRACT

Methods and apparatus are presented for determining data indicative of a photoluminescence (PL) response to solar irradiation from at least one photovoltaic module in a first string of series-connected modules that is one of a plurality of parallel-connected strings connected to an operating inverter. Two or more signals from a module in the first string are measured while modulating its operating point by modulating the illumination intensity incident on selected portions of one or more modules in that string. Measured signals are processed to determine data indicative of a PL response from the module, discriminating the response from the much brighter reflected sunlight. Importantly, this approach has an extended effect whereby modulating the illumination incident on a subset of modules in a string affects the operating point (PL intensity) of all modules in (Continued)

the string, offering increased throughput, reduced cost and improved versatility for outdoor PL imaging of photovoltaic arrays.

38 Claims, 7 Drawing Sheets

(52) U.S. Cl.
CPC . *G01N 21/8806* (2013.01); *G01N 2021/8809* (2013.01); *G01N 2021/8835* (2013.01)

(58) Field of Classification Search
CPC .... G01N 21/8806; H02S 50/15; H04N 23/55; Y02E 10/50
USPC ...................... 356/237.1–237.6, 239.1–239.8
See application file for complete search history.

(56) References Cited

FOREIGN PATENT DOCUMENTS

| WO | 2018098516 A1 | 6/2018 |
| WO | 2020122105 A1 | 6/2020 |

OTHER PUBLICATIONS

Bhoopathy, Raghavi, et al. "Outdoor photoluminescence imaging of photovoltaic modules with sunlight excitation." Progress in Photovoltaics: Research and Applications 26.1 (2018): 69-73.

* cited by examiner

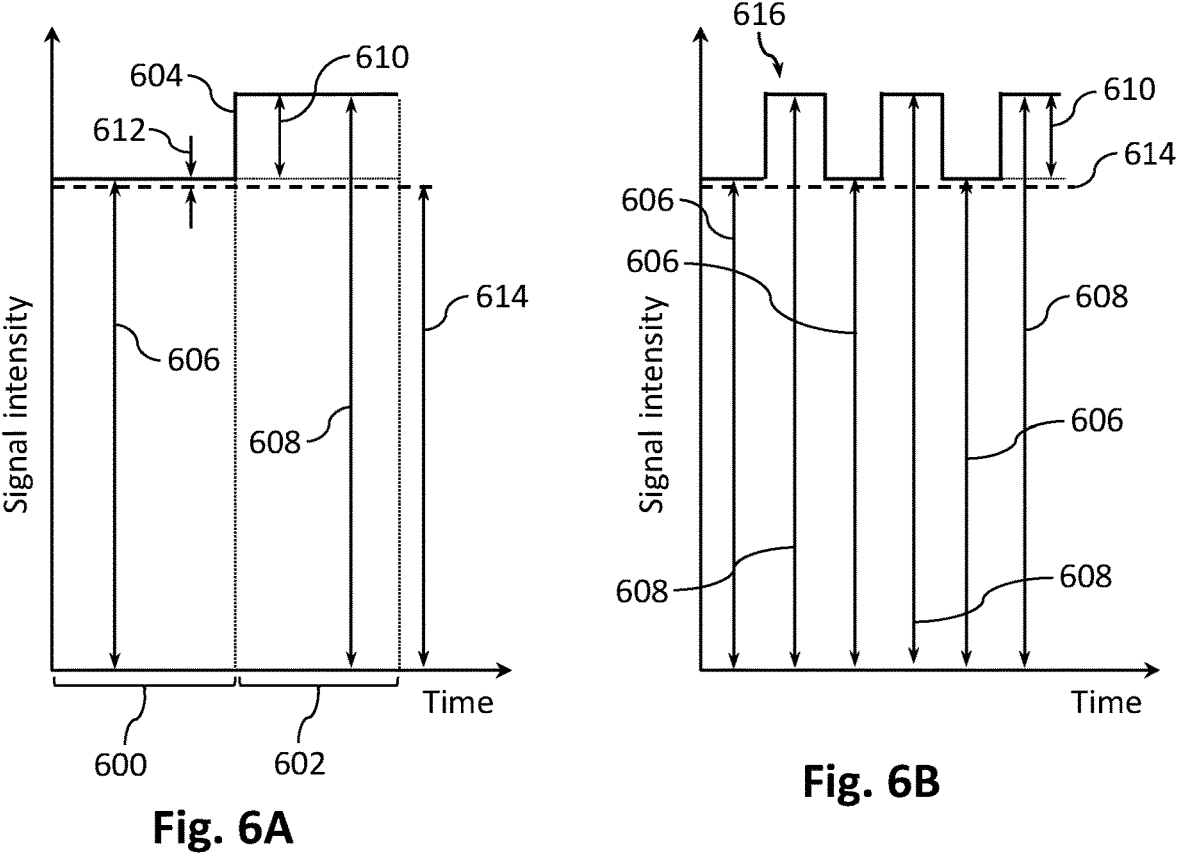
Fig. 6A
Fig. 6B
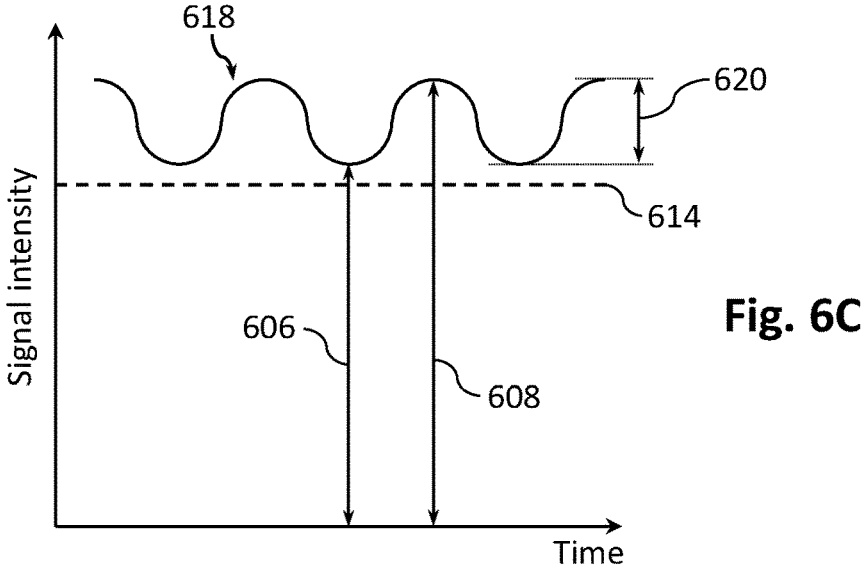
Fig. 6C

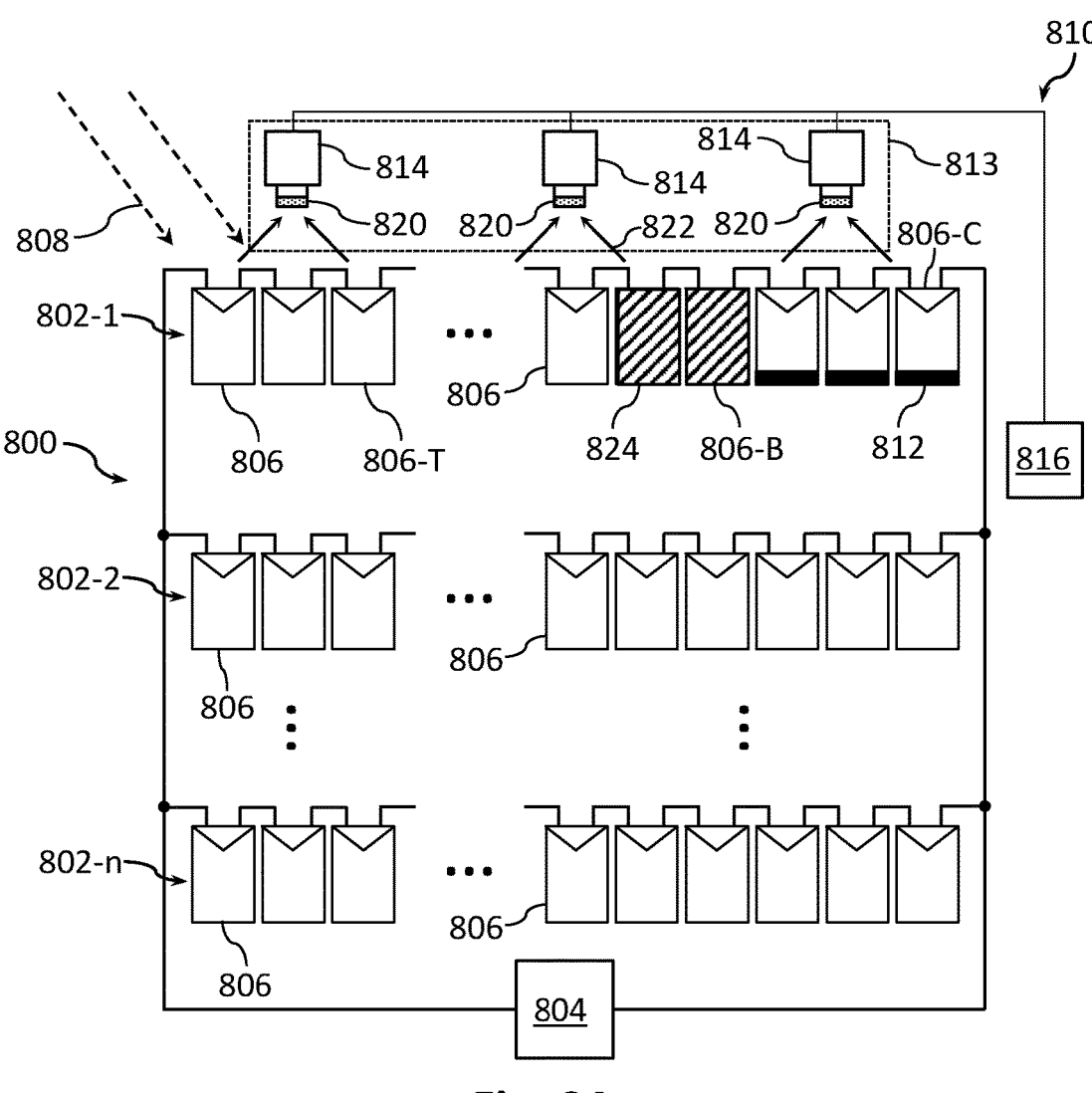
Fig. 8A
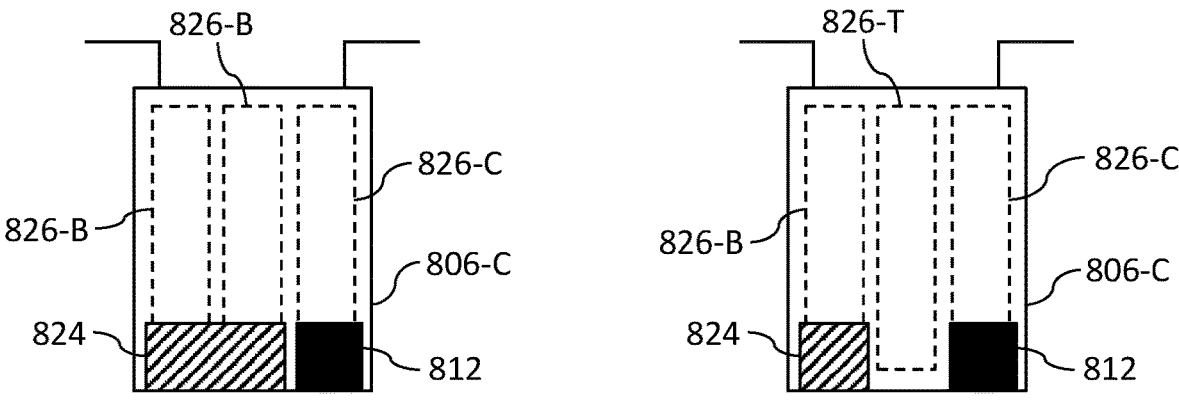
Fig. 8B                    Fig. 8C

OUTDOOR PHOTOLUMINESCENCE IMAGING OF PHOTOVOLTAIC ARRAYS VIA OPTICAL STRING MODULATION

RELATED APPLICATIONS

The present application is a U.S. National Phase Application of International patent application number PCT/AU2022/050607 filed on Jun. 17, 2022, which claims priority from Australian Provisional Patent Application No 2021901847 filed on 18 Jun. 2021, the contents of which are incorporated herein by reference in their entirety.

FIELD OF THE INVENTION

The invention relates to methods and apparatus for inspection of photovoltaic modules, in particular using measurements of photoluminescence generated by solar irradiation. The invention has been developed primarily for in-the-field inspection of photovoltaic modules in large-scale arrays and will be described with reference to this application. However, it will be appreciated that the invention is not limited to this particular field of use.

RELATED APPLICATIONS

The present application claims priority from Australian Provisional Patent Application No 2021901847 filed on 18 Jun. 2021, the contents of which are incorporated herein by reference.

BACKGROUND OF THE INVENTION

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Photovoltaic cells, either in rooftop systems or large-scale installations such as commercial solar farms, are making an increasingly significant contribution to power generation in many countries. The vast majority of photovoltaic installations are based on photovoltaic modules containing a number of crystalline silicon photovoltaic cells. Photovoltaic modules based on thin film materials such as cadmium telluride, copper indium gallium selenide (CIGS) or amorphous silicon are also being installed but in much lower quantities. FIG. 1 shows in schematic form a photovoltaic module 100 comprising seventy-two crystalline silicon photovoltaic cells 102 wired as three sub-strings 104 connected in series, with electrical contacts 106 for extracting charge carriers generated in the cells by absorption of solar radiation or for connecting the module 100 to other such modules in a photovoltaic installation. Each sub-string 104 has a bypass diode (BPD) 108 connected in parallel to limit the extended influence of defective cells and to avoid dangerous reverse junction breakdown that can occur for instance in the case of partial module shading. In photovoltaic installations a number of modules 100 are commonly connected in series via their electrical contacts 106 to form a string of modules. In this specification the term 'sub-string' is used to refer to a plurality of series-connected photovoltaic cells that are generally connected in parallel to a BPD within a photovoltaic module, while the term 'string' is used to refer to a plurality of series-connected photovoltaic modules.

Photovoltaic modules, and in particular the constituent cells, are relatively fragile and are frequently damaged during module manufacture, transportation to an installation site or during installation. Furthermore, they undergo gradual degradation, and may also suffer sudden substantial damage from extreme weather events such as storms, in particular hailstorms, during operation in the field. Because cells in a photovoltaic module are generally connected in series, a single defective cell can disrupt an entire sub-string, significantly reducing the overall efficiency of a module. Failure of the protective BPDs is also quite common, causing additional problems or even safety concerns in photovoltaic installations. Consequently, it is important to be able to monitor photovoltaic modules in the field, i.e. after installation, to identify defective modules for replacement or for evaluating the health, safety and value of a photovoltaic installation.

Several techniques are known for inspection of installed photovoltaic modules, including current-voltage (I-V) measurements, UV fluorescence imaging, thermal infrared imaging (thermography) and luminescence-based imaging. The latter technique, in which the spatial distribution of luminescence from charge carrier recombination is measured with a charged coupled device (CCD) camera or similar device, can provide high-resolution, spatially resolved information on many types of faults of interest including cracks, series resistance problems, shunts, potential induced degradation and bypass diode failure. Electroluminescence (EL) imaging, where charge carriers are generated by electrical excitation via current injection through the device terminals, is routinely used for factory inspection of modules post-manufacture, but is less well suited to in-the-field inspection because of the need for special hardware to be connected electrically either to individual photovoltaic modules or to strings of modules. These electrical connections require modifications to the electrical wiring of the system, which has various associated risks and costs and should therefore be avoided. In particular, modifying the wiring in a photovoltaic installation requires highly trained personnel such as a qualified electrician. On the other hand, with photoluminescence (PL) imaging the charge carriers are generated by optical excitation, with no requirement for electrical contact to the photovoltaic module or modules under test. With the sun being a convenient excitation source, PL imaging offers the possibility of rapid inspection of large-scale photovoltaic installations, for example with drone-mounted cameras similar to thermography, but sensitive to a wider range of faults.

Outdoor PL imaging of photovoltaic modules is, however, challenging, since diffuse or specular reflected sunlight from a module under test is typically about two orders of magnitude greater than the peak of the PL emission from crystalline silicon at or near room temperature around 1135 nm. Even for thin film photovoltaic modules based on direct bandgap materials such as cadmium telluride that are more efficient emitters than silicon, reflected sunlight tends to swamp the PL response. Published US patent application Nos 2015/0155829 A1 and 2018/0262159 A1 disclose techniques for outdoor luminescence imaging in which the operating point of a photovoltaic module under test is modulated electrically, allowing lock-in detection to distinguish the luminescence signal from the ambient sunlight. However, as with EL-based inspection these electrically modulated PL ('EMPL') methods require qualified personnel to install the electrical hardware for biasing the photovoltaic module or modules.

The operating point of a photovoltaic module can alternatively be modulated optically, in a contactless fashion, by controlled partial shading of the module, as disclosed in R. Bhoopathy et al 'Outdoor photoluminescence imaging of photovoltaic modules with sunlight excitation', *Prog. Photovolt. Res. Appl.* 26, 69-73 (2018) and R. Bhoopathy et al 'Outdoor photoluminescence imaging of solar panels by contactless switching: Technical considerations and applications', *Prog. Photovolt. Res. Appl* 28, 217-228 (2020). This optically modulated PL ('OMPL') approach is based on the principle that selectively shading one or more 'control cells' in a sub-string causes all other cells ('test cells') in the same sub-string to be toggled between two electrical operating points, such as the maximum power point (MPP) and open circuit (OC). With the PL emission from an illuminated cell at OC being around twenty times greater than at MPP, modulation of the operating point enables the PL to be discriminated from a much more intense ambient light component that typically arises from reflected sunlight.

As shown schematically in FIG. 2A, PL emission from the test cells 200 in a given sub-string 104 of a photovoltaic module 100 exposed to solar irradiation 206 can be conveniently modulated by covering a control cell 208 (hidden) with a housing 210 containing one or more LEDs 212 selected to illuminate the control cell with around or a little over 1 Sun equivalent light intensity. Ideally, the LED housing 210 completely blocks ambient light from reaching the control cell 208, so that the test cells 200 in the sub-string 104 float to OC when the LEDs 212 are switched off, with the current flowing instead through the associated BPD 108. The test cells 200 revert to MPP when the LEDs are switched on. The resulting change in the PL component of light 214 from the test cells 200 reaching a camera 216 allows a computer 218 to extract an image of PL emitted from the test cells, e.g. by differencing images acquired with the test cells at MPP and OC, for presentation on a display 220.

The overall intensity of ambient light reaching the camera 216 can be substantially reduced with a bandpass filter 222 having cut-on and cut-off wavelengths of about 1125 nm and 1150 nm, exploiting a fortuitous coincidence between the band-to-band PL spectrum of silicon and an atmospheric absorption band around 1135 nm. If necessary or deemed advantageous, operation of the camera 216 and the LEDs 212 can be synchronised by wired or wireless means.

For enhanced inspection throughput it is convenient to perform this operation for all sub-strings in a photovoltaic module under test, by simultaneously toggling the illumination of one or two control cells 208 in each sub-string 104 with an extended LED-equipped housing 224 placed across an entire row of cells as shown in FIG. 2B. This allows the acquisition of an image of PL emitted from all cells 200 in the photovoltaic module 100 except for the chosen control cells 208. To inspect all cells in the photovoltaic module 100 a second PL image can be acquired with the LED housing 224 moved to another row 228 of cells in the module, with the two PL images optionally merged to obtain a single PL image of the entire module 100.

While the above-described optical modulation method enables outdoor PL imaging of photovoltaic modules without any modifications to the electrical contacting, the throughput is limited because modules are inspected individually and multiple image acquisitions are required if all cells in the module under test are to be imaged. Throughputs of about one photovoltaic module per minute have been demonstrated in field trials, corresponding to about 21 kWp per hour for modules rated at 350 Wp.

Furthermore, because this optical modulation technique depends on the BPDs, complications can occur if these diodes are defective, have faulty connections, or have inadvertently been omitted during photovoltaic module assembly. In particular, as explained on pages 151-152 of the IEA-PVPS T13-24:2021 report by W. Hermann et al (April 2021), the shading of a control cell in a sub-string with a BPD defective in open circuit (OC) can result in cell overheating and possibly severe damage to the photovoltaic module under test. While defective BPDs are detectable with the optical modulation technique, as discussed in the R. Bhoopathy et al 2020 paper, great care needs to be taken if the BPD has failed in the OC condition.

Unless the context clearly requires otherwise, throughout the description and the claims the words 'comprising', 'comprises' and the like are to be construed in an inclusive sense as opposed to an exclusive or exhaustive sense. That is, they are to be construed in the sense of 'including, but not limited to'.

OBJECT OF THE INVENTION

It is an object of the present invention to overcome or ameliorate at least one of the limitations of the prior art, or to provide a useful alternative.

SUMMARY OF THE INVENTION

According to a first aspect of the present invention there is provided a method for determining data indicative of a response to solar irradiation of at least one photovoltaic module in a first string of series-connected photovoltaic modules, the first string being one of a plurality of strings of series-connected photovoltaic modules connected in parallel to an inverter and exposed to solar irradiation, the method comprising the steps of:

(i) modulating an intensity of illumination incident on selected portions of one or more photovoltaic modules in the first string selected to be one or more control modules, other photovoltaic modules in the first string being test modules, thereby modulating the operating points of the test modules and the one or more control modules;

(ii) measuring first and second signals from each of one or more of the test modules or control modules at first and second operating points induced by the modulation of the intensity of illumination incident on the one or more control modules; and (iii) processing the measured first and second signals to determine data indicative of the response to the solar irradiation of the one or more test modules or control modules.

In preferred embodiments the response to the solar irradiation comprises a photoluminescence response. More preferably, step (ii) comprises measuring the first and second signals in spatially resolved fashion, such that the data indicative of the photoluminescence response comprises a photoluminescence image of the one or more test modules or control modules.

Preferably, step (ii) comprises measuring first and second signals from each of two or more modules in the first string selected from the test modules or the one or more control modules. In certain embodiments step (ii) comprises measuring first and second signals from each of one or more test modules. In preferred embodiments step (ii) comprises measuring first and second signals from all of the test modules.

More preferably, step (ii) comprises measuring first and second signals from all of the test modules and from all of the control modules.

In certain embodiments the first and second signals are measured by a detector mounted on a moving platform.

In certain embodiments step (i) comprises modulating the intensity of illumination incident on selected portions of a plurality of control modules such that the operating point of the test modules is modulated between approximately the maximum power point and open circuit.

In certain embodiments the method further comprises the step of measuring a phase delay between the modulation of the illumination intensity and the data indicative of the response.

In certain embodiments the number of control modules or the magnitude of the modulation of the incident illumination intensity is selected such that an operating point resulting from the modulation of the incident illumination intensity is different for the test modules than for the one or more control modules. The method may further comprise the step of comparing a response from a test module to a response from a control module.

In certain embodiments step (i) further comprises modulating an intensity of illumination incident on selected portions of one or more selected control modules in a second string of series-connected photovoltaic modules in anti-correlation with the modulation of the intensity of illumination incident on selected portions of the one or more control modules in the first string. Preferably, the modulated operating points of the first and second strings are selected such that the total current delivered to the inverter remains substantially constant.

In certain embodiments the method further comprises the step of shading selected portions of one or more photovoltaic modules in the first string selected to be bias modules, while modulating the intensity of illumination incident on selected portions of the one or more control modules in the first string. Additionally or alternatively, the method may further comprise the step of shading selected portions of one or more control modules in the first string, while modulating the intensity of illumination incident on selected portions of the one or more control modules in the first string.

In certain embodiments the method further comprises the step of varying the inverter voltage so as to shift the operating point of all of the parallel-connected strings.

In certain embodiments step (ii) comprises measuring one or more additional signals from each of one or more of the test modules or control modules at one or more additional operating points induced by the modulation of the intensity of illumination incident on the one or more control modules, and step (iii) comprises processing the measured additional signals to determine additional data indicative of the response to solar irradiation of the one or more test modules or control modules.

According to a second aspect of the present invention there is provided an article of manufacture comprising a non-transitory computer readable medium having a computer readable program code configured to implement at least step (iii) of the method according to the first aspect.

According to a third aspect of the present invention there is provided an apparatus for determining data indicative of a response to solar irradiation of at least one photovoltaic module in a first string of series-connected photovoltaic modules, the first string being one of a plurality of strings of series-connected photovoltaic modules connected in parallel to an inverter and exposed to solar irradiation, the apparatus comprising:

(i) one or more optical modulators for modulating an intensity of illumination incident on selected portions of one or more photovoltaic modules in the first string selected to be one or more control modules, other photovoltaic modules in the first string being test modules, thereby modulating the operating points of the test modules and the one or more control modules;

(ii) a measurement system for measuring, at first and second operating points induced by the modulation of the intensity of illumination incident on the one or more control modules, first and second signals from each of one or more of the test modules or control modules; and (iii) a computer for processing the measured first and second signals to determine data indicative of a response to solar irradiation of the one or more test modules or control modules.

Preferably, the measurement system comprises one or more detectors sensitive to photoluminescence emitted from the one or more test modules or control modules in response to the solar irradiation. More preferably, the measurement system comprises one or more cameras for measuring the first and second signals in spatially resolved fashion, such that the data indicative of the response comprises a photoluminescence image of the one or more test modules or control modules.

Preferably, the measurement system is configured to measure first and second signals from each of two or more modules in the first string selected from the test modules or the one or more control modules. In certain embodiments the measurement system is configured to measure first and second signals from each of one or more test modules. Preferably, the measurement system is configured to measure first and second signals from all of the test modules. More preferably, the measurement system is configured to measure first and second signals from all of the test modules and from all of the control modules.

In certain embodiments the measurement system is mounted on a moveable platform.

In certain embodiments the one or more optical modulators are configured to modulate the intensity of illumination incident on selected portions of a plurality of control modules such that the operating point of the test modules is modulated between approximately the maximum power point and open circuit.

In certain embodiments the computer is configured to measure a phase delay between the modulation of the illumination intensity and the data indicative of the response.

In certain embodiments the one or more optical modulators are configured such that the number of control modules or the magnitude of the modulation of the incident illumination intensity is selected such that an operating point resulting from the modulation of the incident illumination intensity is different for the test modules than for the one or more control modules. The computer may be configured to compare a response from a test module to a response from a control module.

In certain embodiments the apparatus further comprises one or more optical modulators for modulating an intensity of illumination incident on selected portions of one or more selected control modules in a second string of series-connected photovoltaic modules in anti-correlation with the modulation of the intensity of illumination incident on selected portions of the one or more control modules in the first string. Preferably, the optical modulators on the control modules in the first string and the second string are configured such that, in use, the total current delivered to the inverter remains substantially constant.

In certain embodiments the apparatus further comprises means for shading selected portions of one or more photovoltaic modules in the first string selected to be bias modules, while the intensity of illumination incident on selected portions of the one or more control modules in the first string is being modulated. Additionally or alternatively, the apparatus may further comprise means for shading selected portions of one or more control modules in the first string, while modulating the intensity of illumination incident on selected portions of the one or more control modules in the first string.

In certain embodiments the computer is configured to vary the inverter voltage so as to shift the operating point of all of the parallel-connected strings.

In certain embodiments the measurement system is configured to measure one or more additional signals from each of one or more of the test modules or control modules at one or more additional operating points induced by the modulation of the intensity of illumination incident on the one or more control modules, and the computer is configured to process the measured additional signals to determine additional data indicative of the response to solar irradiation of the one or more test modules or control modules.

According to a fourth aspect of the present invention there is provided an article of manufacture comprising a non-transitory computer readable medium having a computer readable program code configured to operate the apparatus according the third aspect.

BRIEF DESCRIPTION OF THE DRAWINGS

Preferred embodiments of the invention will now be described, by way of example only, with reference to the accompanying drawings in which:

FIGS. 6A, 6B and 6C show in schematic form the modulation of a signal intensity from a cell in a test module resulting from optical modulation of a number of control modules in the same string, according to various embodiments;

FIG. 8A shows in schematic form a photovoltaic array comprising a plurality of parallel-connected strings of photovoltaic modules, and an apparatus for determining data indicative of a PL response from one or more photovoltaic modules in the array under solar irradiation, according to an embodiment of the present invention; and FIGS. 8B and 8C show in schematic form photovoltaic modules subjected to different combinations of fixed and modulated shading according to some embodiments of the present invention.

DETAILED DESCRIPTION OF THE INVENTION

Figure 3:
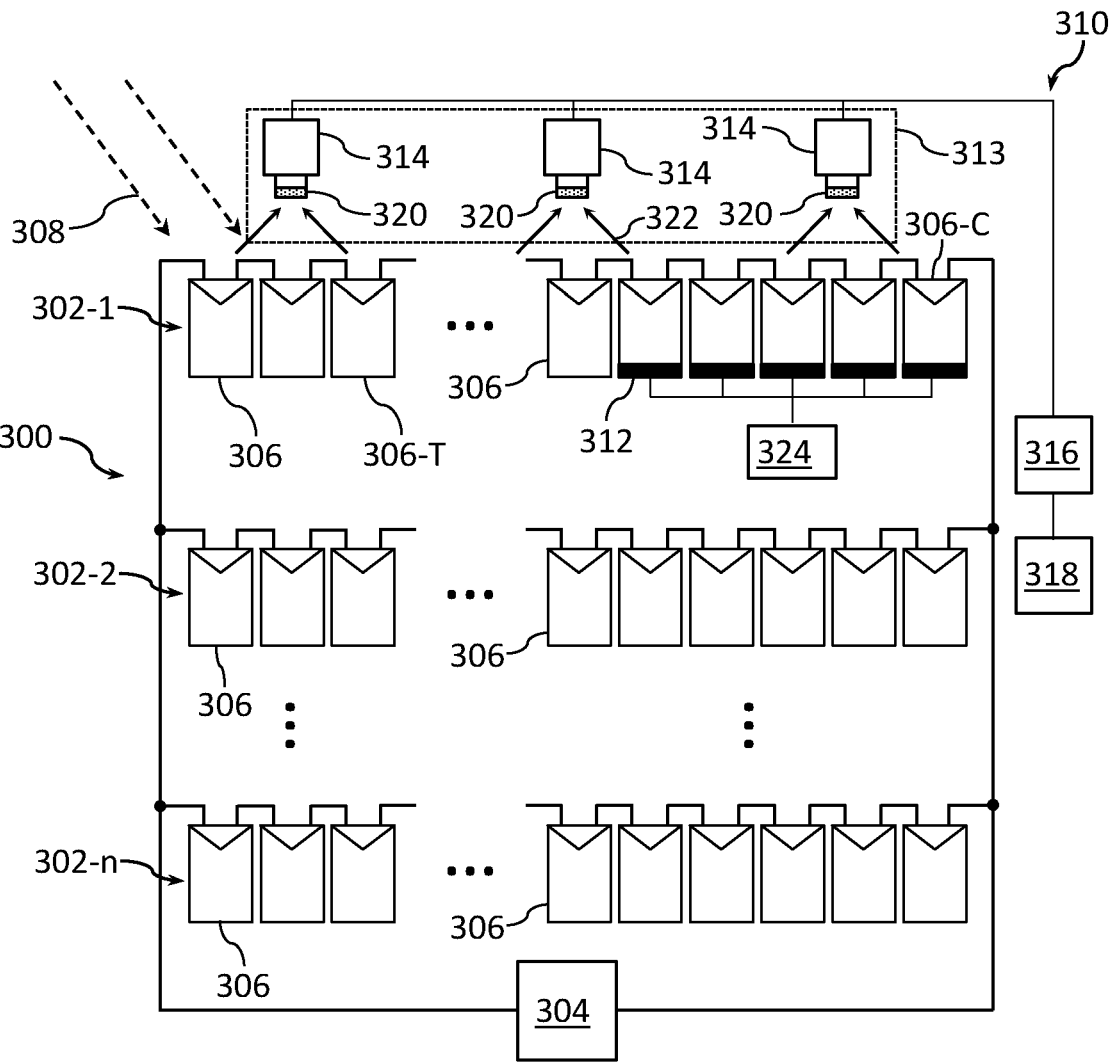
FIG. 3 shows in schematic form a photovoltaic array comprising a plurality of parallel-connected strings of photovoltaic modules, and an apparatus for determining data indicative of a PL response from one or more photovoltaic modules in the array under solar irradiation, according to an embodiment of the present invention.

FIG. 3 shows in schematic form a photovoltaic array 300 comprising a plurality of photovoltaic module strings 302-1, 302-2 . . . 302-$n$ connected in parallel to an inverter 304. Each string 302 comprises a plurality of photovoltaic modules 306 connected in series, with the number of modules 306 in a string 302 generally limited by regulatory restrictions on the maximum allowable voltage, for example 1.5 kV. If a given type of photovoltaic module has a rated open circuit voltage of 50 V for example, no more than thirty such modules could be series-connected in a string. In practice string lengths of twenty-seven to twenty-nine photovoltaic modules are relatively common for large scale installations, and the array 300 depicted in FIG. 3 may for example have twenty-eight modules 306 per string 302. The number of strings 302 connected in parallel to a single inverter 304 may be quite large, e.g. in excess of two hundred in a large scale photovoltaic installation such as a solar farm. This reduces the number of inverters required, thereby reducing system costs and simplifying system maintenance.

Figure 2A:
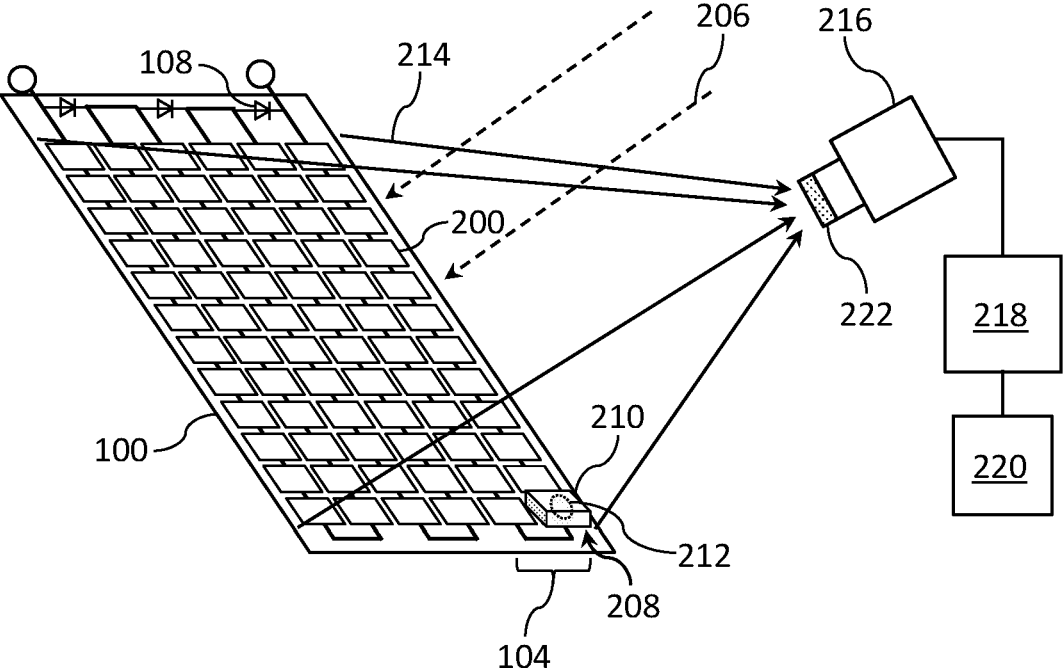
FIG. 2A shows in schematic form a setup for outdoor PL imaging of a photovoltaic module.
Figure 2B:
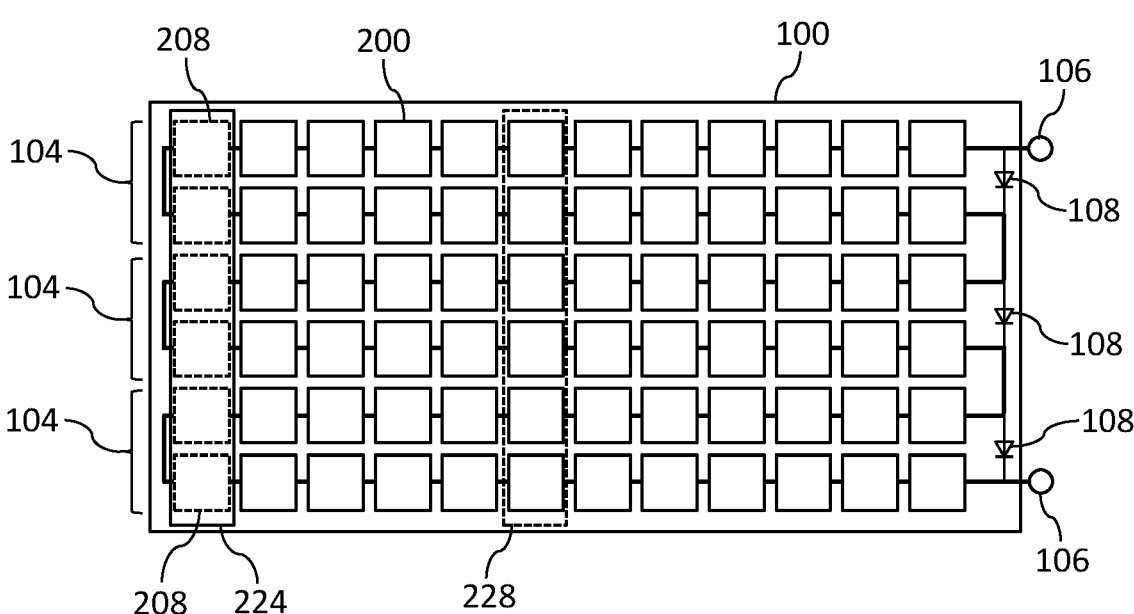
FIG. 2B shows in schematic form an example scheme for optically modulating the operating point of a photovoltaic module for an outdoor PL imaging method.

Instead of modulating individual photovoltaic modules as in the method described with reference to FIGS. 2A and 2B, in the 'string modulation' method of the present invention the operating point of an entire string 302-1 is modulated by modulating the illumination intensity incident on selected portions of one or more 'control modules' 306-C in that string, while the photovoltaic array 300 as a whole is exposed to solar irradiation 308. In the specific example shown in FIG. 3, optical modulators 312 are used to modulate the illumination intensity incident on selected portions of five of the photovoltaic modules 306-C in a first string 302-1. Recalling that photovoltaic modules typically comprise a plurality of sub-strings of cells, the illumination intensity incident on at least one cell in at least one sub-string in each control module 306-C may be modulated. That is, the 'selected portion' of a control module 306-C being optically modulated will generally comprise one or more photovoltaic cells in one or more sub-strings of that module. Photovoltaic modules in the first string 302-1 that are not selected to be control modules 306-C are referred to as 'test modules' 306-T.

Accordingly, FIG. 3 also depicts an apparatus 310 for determining data indicative of a photoluminescence response to solar irradiation 308 of at least one photovoltaic module 306 in a first string 302-1 of series-connected photovoltaic modules 306, the first string 302-1 being one of a plurality of strings 302-1, 302-2 . . . 302-$n$ of series-connected photovoltaic modules 306 connected in parallel to an inverter 304, when the photovoltaic modules 306 in the plurality of strings 302-1, 302-2 . . . 302-$n$ are exposed to solar irradiation 308. The apparatus 310 comprises: one or more optical modulators 312 for modulating an intensity of illumination incident on selected portions of one or more photovoltaic modules 306 in the first string 302-1 selected to be one or more control modules 306-C, other photovoltaic modules 306 in the first string 302-1 being test modules 306-T, thereby modulating the operating points of the test modules 306-T and the one or more control modules 306-C; a measurement system 313 for measuring, at first and second operating points induced by the modulation of the intensity of illumination incident on the one or more control modules 306-C, first and second signals 322 from each one or more of the test modules 306-T or control modules 306-C; and a computer 316 for processing the measured first and second signals 322 to determine data indicative of a photolumines- cence response to solar irradiation of the one or more test modules 306-T or control modules 306-C. The apparatus 310 may also comprise a display 318 for displaying or presenting the data indicative of the photoluminescence response of the one or more test modules 306-T or control modules 306-C. The computer 316 may be one or more of a desktop computer, laptop computer, tablet computer, per- sonal digital assistant, single-board computer, smartphone, and/or hardware manufactured specifically for performing methods or providing apparatus according to the present disclosure, or otherwise. Generally, it will be recognised that the computer can comprise a number of control or process- ing units configured to control one or more components or functions of the methods and apparatus, and process data, and may also include one or more storage devices, for storing data. The units and storage devices can be imple- mented using one or more processing devices and one or more data storage devices, which may be at one location or distributed across multiple locations and interconnected by one or more communication links.

In preferred embodiments the measurement system 313 comprises one or more image capture devices such as cameras 314 for measuring the first and second signals 322 in spatially resolved fashion. In these embodiments the data indicative of the photoluminescence may be in the form of one or more PL images, i.e. images of PL emitted by one or more modules 306-T, 306-C in the first string 302-1 in response to the solar irradiation 308. To reduce the intensity of ambient light the cameras 314 may be fitted with filters 320 such as bandpass filters designed to pass the PL emitted by the cells of the modules 306-T, 306-C while excluding or reducing solar radiation outside the luminescence band(s). For silicon-based modules a bandpass filter with centre wavelength around 1135 nm and a FWHM bandwidth of about 25 nm may be suitable. As disclosed in published PCT application No WO 2021/248209 A1 entitled 'Outdoor photoluminescence imaging of photovoltaic modules', highly efficient rejection of ambient light can be achieved with one or more filters selected to pass a spectral band having a centre wavelength in the range 1134.0 to 1136.0 nm and a FWHM bandwidth of 3.0 nm or less, targeting a particularly deep and narrow atmospheric absorption band. In embodiments where spatially resolved measurements are not required, the measurement system 313 may comprise one or more point detectors such as photodiodes, or one or more spectrometers for evaluating the spectral content of light 322 received from one or more modules 306-T, 306-C.

In certain embodiments the optical modulators 312 use selective shading techniques similar to those described above with reference to FIGS. 2A and 2B. That is, at least one 'control' cell 208 in at least one sub-string 104 of one or more control modules 306-C is covered with a housing 210, 224 having one or more switchable light sources such as LEDs 212 to toggle the operating point of the other cells 200 in that sub-string. In the embodiment shown schemati- cally in FIG. 3, all sub-strings in a control module 306-C may be acted on together by modulating the illumination intensity incident on an entire row of cells in the control module, similar to the situation depicted in FIG. 2B. The optical modulators 312 on individual control modules 306-C may have a common controller 324 or separate external or internal controllers, containing power supplies, control elec- tronics and the like.

Figure 1:
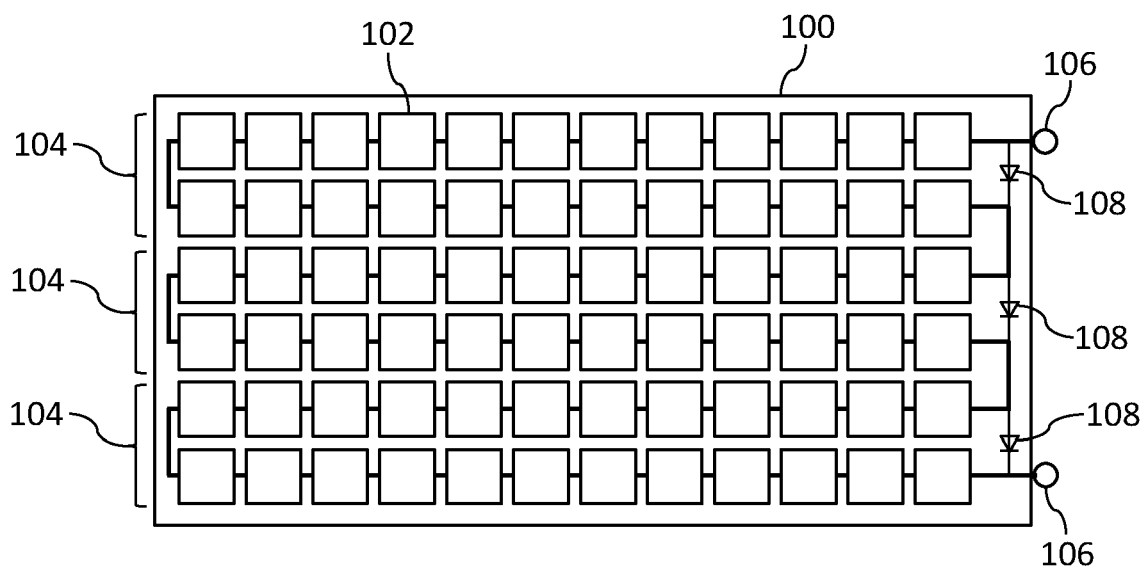
FIG. 1 shows in schematic form a typical photovoltaic module.
Figure 2C:
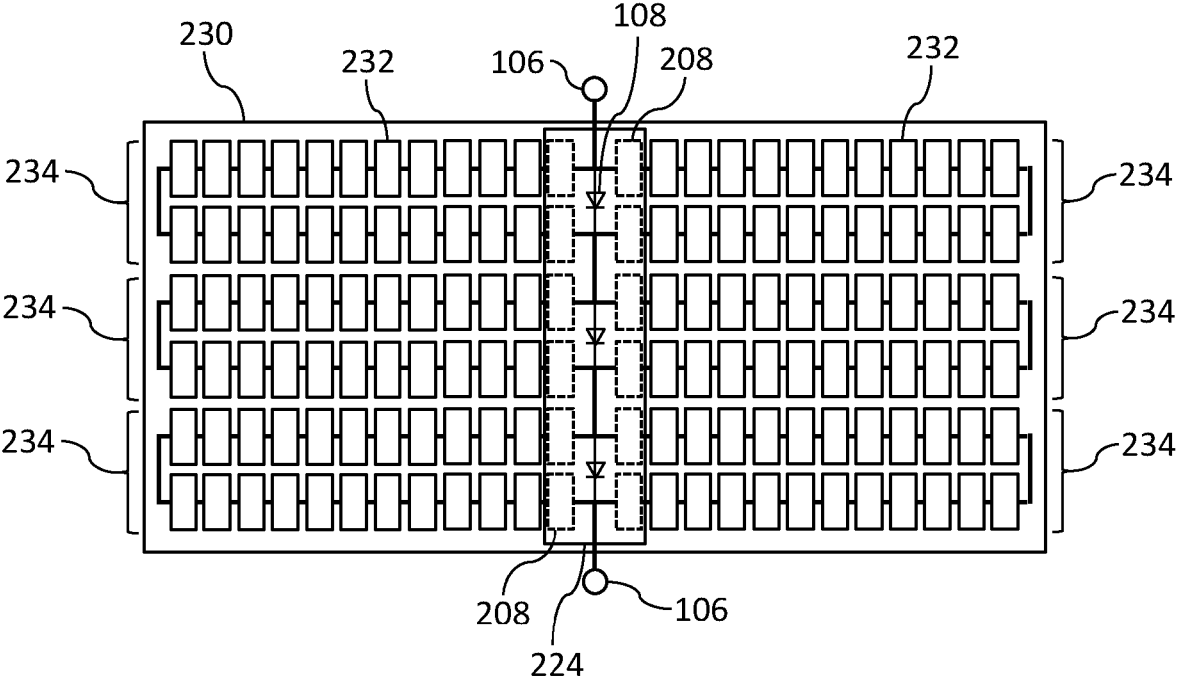
FIG. 2C shows in schematic form an example scheme for optically modulating the operating point of a photovoltaic module comprising half-cells.

As depicted in FIG. 1, photovoltaic modules 100 have traditionally been constructed with sub-strings 104 of 'full' photovoltaic cells 102. As depicted in FIG. 2C on the other hand, for various reasons including higher power output many state-of-the-art modules 230 are constructed with a plurality of half-cells 232 wired in sub-strings 234 on either side of the BPDs 108 and module terminals 106. To modu- late the operating point of a so-called half-cell module 230, it is convenient to place the optical modulator(s) 224 cen- trally as shown, so that each sub-string 234 has at least one control cell 208.

We now consider the application of the string modulation method to an operating photovoltaic array 300 having a plurality of module strings 302-1, 302-2 . . . 302-n connected in parallel to an inverter 304, with each module string comprising twenty-eight series-connected modules with, say, seventy-two cells. Values for open circuit voltage, short circuit current and voltage, current and power at MPP for a typical twenty-eight module string are given in Table 1.

TABLE 1

|  | Module string | Module | Cell |
|---|---|---|---|
| $V_{oc}$ (V) | 1272 | 45.43 | 0.631 |
| $I_{sc}$ (A) | 9.72 | 9.72 | 9.72 |
| $V_{MPP}$ (V) | 1061 | 37.90 | 0.526 |
| $I_{MPP}$ (A) | 9.24 | 9.24 | 9.24 |
| $P_{MPP}$ (W) | 9800 | 350 | 4.861 |

Before explaining the string modulation method, it will be helpful to recall the OMPL method described previously with reference to FIG. 2A. If the charge carrier generation rate in one or more control cells 208 in a sub-string 104 of a module 100 under solar irradiation 206 is reduced by shading 210, such that the light-induced current in that control cell falls below the MPP current, the current flowing in all other cells 200 in that sub-string will be reduced accordingly, activating the associated BPD 108. A portion or all of the current that would have flowed through the sub-string 104 now flows through the BPD 108, while the other cells 200, that are still illuminated, now operate at OC or some point between OC and MPP. Because the sub-string 104 is being at least partially bypassed, the voltage gener- ated by the module 100 drops by about one third as soon as the degree of shading of the control cell(s) 208 reduces the light generated current in the sub-string 104 to a value below the MPP current. At that stage the shaded control cells will be substantially reverse-biased by the non-shaded cells in the sub-string. If at least one control cell 208 in each sub-string 104 of the module 100 is fully shaded then the module will be completely bypassed, generating close to zero voltage. In actual fact a slightly negative voltage will be present, in accordance with the combined forward voltages of the BPDs at the respective sub-string current.

Returning now to FIG. 3, when the illumination intensity incident on selected cells of a 'control module' 306-C in a first module string 302-1 is reduced by an optical modulator 312, the contribution of that module to the overall voltage of the string 302-1 will decrease, effectively to about zero if all its sub-strings of cells are completely bypassed. However, because the module string 302-1 is connected in parallel to a number of other module strings 302-2 . . . 302-n in the array 300 via the inverter 304, the other modules 306-T in the string 302-1, i.e. the test modules, must increase their operating voltage such that the string voltage, i.e. the sum of voltages of all series-connected modules 306 in the string, stays effectively unchanged. This drives the test modules 306-T closer to OC, thereby increasing the amount of PL emitted from their constituent cells.

The effect of optically modulating one or more control modules 306-C in a 28-module string with the parameters shown in Table 1 has been modelled using an equivalent circuit simulation for the case where the selected control modules are completely bypassed by fully shading their selected control cells. The results are shown in Table 2, with the string current and test module voltage plotted against the number of bypassed modules in FIG. 4.

TABLE 2

| No of modules bypassed | String current (A) | Change in string current (A) | Percent change in string current | Test module voltage (V) |
|---|---|---|---|---|
| 0 | 9.24 | — | — | 37.90 |
| 1 | 8.71 | 0.53 | 5.5% | 39.39 |
| 2 | 7.61 | 1.10 | 11.3% | 41.00 |
| 3 | 5.53 | 2.08 | 21.4% | 42.72 |
| 4 | 2.10 | 3.43 | 35.2% | 44.54 |
| 5 | 0.01 | 2.09 | 21.5% | 45.43 |

Figure 4:
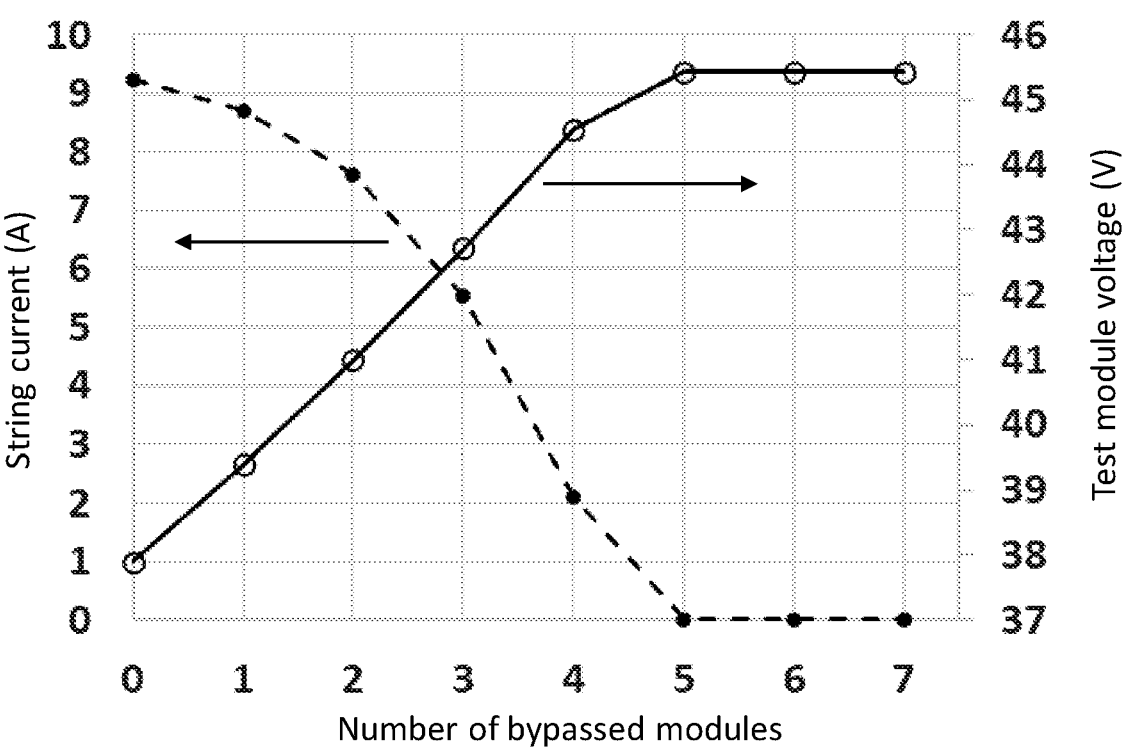
FIG. 4 presents modelling results showing the dependence of string current and test module voltage on the number of optically modulated photovoltaic modules in a twenty-eight module string that is embedded into an operating photovoltaic array.

From FIG. 4 it can be seen that as the number of bypassed control modules in the string increases, the string current (left axis) decreases from the MPP value of 9.24 A, reaching essentially zero when five or more control modules are bypassed. At the same time the voltage across each of the test modules 306-T (right axis) increases from the MPP value of 37.90 V, reaching the open circuit value of 45.43 V when five or more control modules 306-C are bypassed. Since the PL intensity from an illuminated photovoltaic cell decreases as more current is extracted, the reduction in string current plotted in FIG. 4 essentially correlates with an increase in PL signal. In Table 2 the percent change in string current caused by each additional bypassed module is calculated relative to the short circuit current Ise, i.e. 9.72 A according to Table 1. The total percent change in string current is approximately 95%, consistent with the PL intensity at MPP being about 5% of the PL intensity at open circuit. If the equivalent circuit modelling is performed on the basis of sub-strings rather than entire modules, it turns out that for a string of twenty-eight modules, each with three sub-strings, the string current falls to zero when fourteen of the sub-strings are bypassed.

We note that some photovoltaic modules are constructed with bifacial cells that can generate additional photocurrent from light reaching the rear surface of the cells, with the rear illumination typically being about 10% of the front illumination. The ability for light to reach the rear surface of bifacial cells will somewhat reduce the available range of operating points, unless steps are taken to shade both the rear and front surfaces. In terms of string current the available range of current may for example be from 95% of short circuit current ($I_{sc}$) to 10% rather than from 95% to zero for the case of conventional monofacial cells. We have found, however, that the PL signal from bifacial modules can still be readily discriminated from ambient light even if only the front surfaces are shaded.

Finer control of the string current and test module voltage can be achieved by adjusting the shading of one or more of the control module(s) 306-C such that only some of their cell sub-strings are bypassed. Alternatively, the string current and test module voltage can be controlled by adjusting the incident illumination intensities provided by the optical modulators 312. In the latter case, rather than switching the illumination intensity between approximately zero and 1 Sun, the illumination intensity could for example be switched between approximately zero and 0.5 Sun, or between any other two states, which will affect the appearance of a resultant PL image and expose series resistance features, for example, more or less strongly.

The number of sub-strings in control modules 306-C required for full switching of the test modules 306-T, i.e. to drive the test modules from MPP to OC, depends on the number of modules in the string 302-1 and on the specific module parameters, but generally about 17%, i.e. about one in six, of the cell sub-strings in a module string would need to be bypassed to achieve the highest PL contrast between the signals measured from a test module 306-T at the two operating points. For example in a string of twenty-eight modules with three cell sub-strings per module, fourteen of the eighty-four sub-strings would need to be bypassed to achieve the highest PL contrast from a test module.

It follows from FIG. 4 that toggling the selective shading, i.e. optical modulation, applied to a sufficient number of control modules in a string enables the PL emission from the cells in the test modules to be switched from a relatively low level at MPP to a much higher level at OC, allowing a PL signal to be discriminated from ambient light. Importantly, the effect of the modulation is not confined to the module(s) being selectively shaded, i.e. the control module(s), but extends to all modules in a string. This includes the control modules, since the test cells in these modules, i.e. the unshaded cells, can also be switched between MPP and OC.

In one particular embodiment, as the operating point is modulated a sequence of images of the string 302-1 under test is acquired with one or more cameras 314 having a suitable field of view. The resulting change in the PL component of light 322 from the modules 306 in the string 302-1 reaching the one or more cameras 314 allows a computer 316 equipped with suitable computer readable program code to extract PL images of all modules in the string, for presentation on a display 318. Operation of the camera(s) 314 and the modulators 312 may be synchronised by wired or wireless communication between the camera(s) 314 and a controller 324 for the modulators 312, or between the computer 316, camera(s) 314 and modulator controller 324. We note however that synchronisation is not essential. For example, if the cameras 314 acquire images at a rate that is, say, five or ten times higher than the switching frequency of the modulators 312, the computer 316 can determine the time of switching by analysing the image intensities and discard any images acquired during a switching event where the PL intensity may be at some intermediate value.

Figure 5:
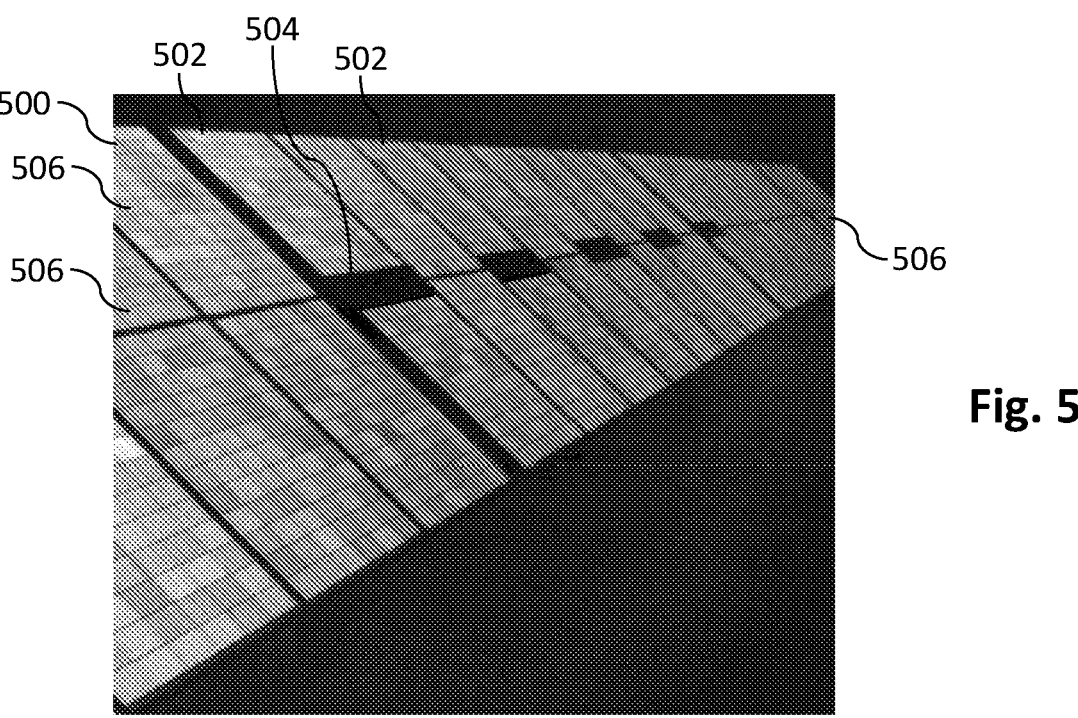
FIG. 5 shows a PL image of a portion of a string of half-cell photovoltaic modules obtained using a method of the present invention.

FIG. 5 shows a PL image of part of a string of half-cell bifacial modules 500 under solar irradiation obtained using the string modulation method of the present invention, with optical modulators 504 in the form of LED-equipped housings on five selected control modules 502 visible as dark rectangles. As discussed previously in relation to FIG. 2C, the optical modulators 504 were placed centrally to modulate the half-cell sub-strings on both sides of each control module 502 simultaneously. The PL image was obtained from fifty pairs of images measured at the two operating points induced by operation of the modulators 504. Individual images were taken at about 100 fps with a near infrared sensitive InGaAs camera fitted with a bandpass filter having centre wavelength 1135 nm and FWHM bandwidth 25 nm, yielding a total acquisition time of about 1 s. It will be noted that, with the exception of the few cells obscured by the modulators 504, the control modules 502 can be imaged at the same time as the test modules 506.

Notably, the PL image shown in FIG. 5 was obtained on an overcast day with an estimated insolation of about 0.5 Suns. With the modulators 504 placed only on the front surfaces of the bifacial control modules 502, we estimate that we were able to achieve about 80 to 85% modulation of 0.5 Suns. The ability to obtain PL images in overcast conditions demonstrates that our string modulation method does not necessarily require solar irradiation in the form of direct sunlight.

In certain embodiments the illumination intensities applied to the selected control cells of the selected control modules are controlled with one or more optical modulators comprising LEDs in ambient light-blocking housings, similar to the OMPL method described in the above mentioned Bhoopathy et al papers. In alternative embodiments the illumination intensities are controlled with one or more optical modulators in the form of manually operated or automated mechanical shutters, acousto-optic or electro-optic modulators, electrically-controlled LCDs or other optical modulation means known in the art. In a particularly simple embodiment a mechanical shutter could be actuated once or a relatively few times, manually or automatically, to vary the illumination intensity incident on the selected control cells.

While the string modulation apparatus depicted in FIG. 3 has been described in terms of capturing images with one or more cameras 314 for processing in a computer 316 for extraction of PL images from a much stronger background, the method is not limited to imaging measurements. As mentioned previously the measurement system 313 could be in the form of one or more point detectors such as photodiodes for detection and extraction of a non-spatially resolved PL signal from the entire module string 302-1 or from some subset thereof, e.g. from a selected module 306-T, 306-C or from one or more selected cells in a module. Non-imaging PL measurements could, for example, be used as a simple test for the presence of BPDs that have failed in OC.

In general terms, the string modulation technique of the present invention provides a method for determining data indicative of a photoluminescence response to solar irradiation 308 of at least one photovoltaic module 306 in a first string 302-1 of series-connected photovoltaic modules 306 that is one of a plurality of strings 302-1, 302-2 . . . 302-$n$ of series-connected photovoltaic modules connected in parallel to an inverter 304 and exposed to solar irradiation. The method comprises the steps of: modulating an intensity of illumination incident on selected portions of one or more photovoltaic modules 306 in the first string 302-1 selected to be one or more control modules 306-C, other photovoltaic modules 306 in the first string 302-1 being test modules 306-T, thereby modulating the operating points of the test modules 306-T and the one or more control modules 306-C; measuring first and second signals from each of one or more of the test modules 306-T or control modules 306-C at first and second operating points induced by the modulation of the intensity of illumination incident on the one or more control modules 306-C; and processing the measured first and second signals to determine data indicative of the photoluminescence response to the solar irradiation of the one or more test modules 306-T or control modules 306-C. In general at least the processing step will be performed by a computer 316 equipped with suitable computer readable program code. If the one or more optical modulators 312 or the measurement system 313 are controlled by the computer 316, then the computer may also be equipped with suitable computer readable program code for performing the modulating or measuring steps.

There is considerable flexibility in the forms of the modulation and the measurement and processing of the first and second signals. In particular, the modulation of the illumination intensity, and consequently the modulation of the operating point, may but need not be periodic or repeated. In one example approach, illustrated schematically in FIG. 6A, the operating point of a test module is switched from MPP 600 to OC 602 by reducing the incident illumination intensity on a sufficient number of control modules, e.g. with a mechanical shutter or switching of LEDs, resulting in a step increase 604 in the PL emission intensity from one or more cells of the test module, recalling that the PL emission from silicon cells at MPP is only about 5% of the PL emission at OC. First and second signals 606, 608 are measured with the cells at MPP 600 and OC 602 and processed by differencing to separate a PL response 610 from a background signal level 614. The small PL component 612 in the first, MPP signal 606 will be lost in the differencing. If required for improved signal-to-noise the MPP and/or OC signals 606, 608 can be measured multiple times and averaged prior to differencing.

In an alternative approach, illustrated schematically in FIG. 6B, a square wave modulation 616 is imposed on the operating point of a test module by repeated operation of the optical modulators on the selected control modules, e.g. by repeated on/off switching of the associated LEDs or mechanical shutters to modulate the illumination intensity incident on one or more cells in each control module. One or more signal measurements 606, 608 at each repeated operating point are made and processed to separate a PL response 610 from a background signal level 614. In one example embodiment the LEDs are switched at a frequency of 10 Hz and signal measurements made at a frequency of 100 Hz, e.g. with a camera having a 100 Hz frame rate. If the background signal level 614 has some gradual time variation, e.g. because of intermittent cloud cover, the processing step may advantageously comprise differencing of signals 606, 608 measured in successive operating point windows, followed by averaging of the difference measurements to obtain data indicative of the PL response. Alternatively, a sequence of first and second signal measurements may be averaged before differencing.

In yet another approach, illustrated schematically in FIG. 6C, the operating point of a test module may be modulated smoothly, e.g. with a sinusoid 618 as shown, by appropriate gradual operation of the optical modulators on the selected control modules. In this approach the signal intensity could be measured or sampled 606, 608 at an appropriately high frequency relative to the modulation frequency, e.g. 100 Hz sampling and 10 Hz modulation, and lock-in detection techniques used to discriminate the time-varying component 620 from a background 614.

Returning now to FIG. 3, when optical modulation is applied to the one or more control modules 306-C of a string 302-1 at modest frequencies, e.g. of order 10 Hz, the operating point and hence the level of PL emission from cells in the test modules 306-T or the control modules 306-C will follow the optical modulation with virtually zero phase delay. As the modulation frequency is increased, however, a measurable phase delay may begin to appear between the PL response and the optical modulation because of the limited response speed of some components in the photovoltaic array 300. Factors that may limit the PL response speed include the activation speed of the BPDs in the control modules 306-C and the speed with which the test modules 306-T are able to increase their voltage to compensate for the voltage drop in the control modules 306-C. The capacitance and minority carrier lifetime in a given photovoltaic cell technology could also contribute to a phase delay. A measurable phase delay may provide useful information on the operation or performance of a photovoltaic array 300 or its components including the photovoltaic cells, photovoltaic modules 306, strings 302-1, 302-2 . . . 302-n and inverter 304. This is another application where it may be advantageous to detect a PL response with a point detector such as a photodiode rather than a camera, because point detectors generally offer significantly faster acquisition speed. In cases where the optical modulation, i.e. the modulation of the incident light intensity on selected cells of one or more control modules 306-C, is applied at a significantly lesser frequency than the measurement or sampling frequency, the switching speed of the optical modulators 312 is less critical. With effective minority charge carrier lifetimes in the order of hundreds of microseconds or exceeding 1 ms in cells of modern high efficiency modules, high speed switching may not be necessary for a phase delay to appear.

As mentioned previously with reference to the simulation results shown in FIG. 4, the string current in the example 28-module string 302 drops from 9.24 A to zero when five or more control modules 306-C are fully bypassed by modulation of the incident illumination intensity via operation of the optical modulators 312. The current delivered to the inverter 304 by the photovoltaic installation 300 as a whole will, accordingly, decrease by 9.24 A, potentially affecting the operating voltage of the inverter 304. However this effect will be small when the module string 302-1 being inspected is one of a large number of strings 302-1, 302-2 . . . 302-n connected in parallel. For example if a photovoltaic array 300 has two hundred strings connected in parallel, corresponding to a total MPP current of ~2 kA, modulation of one string 302-1 will decrease the current by only 0.5%, which is unlikely to cause the inverter 304 to modify the operating point of the entire array 300.

Figure 7:
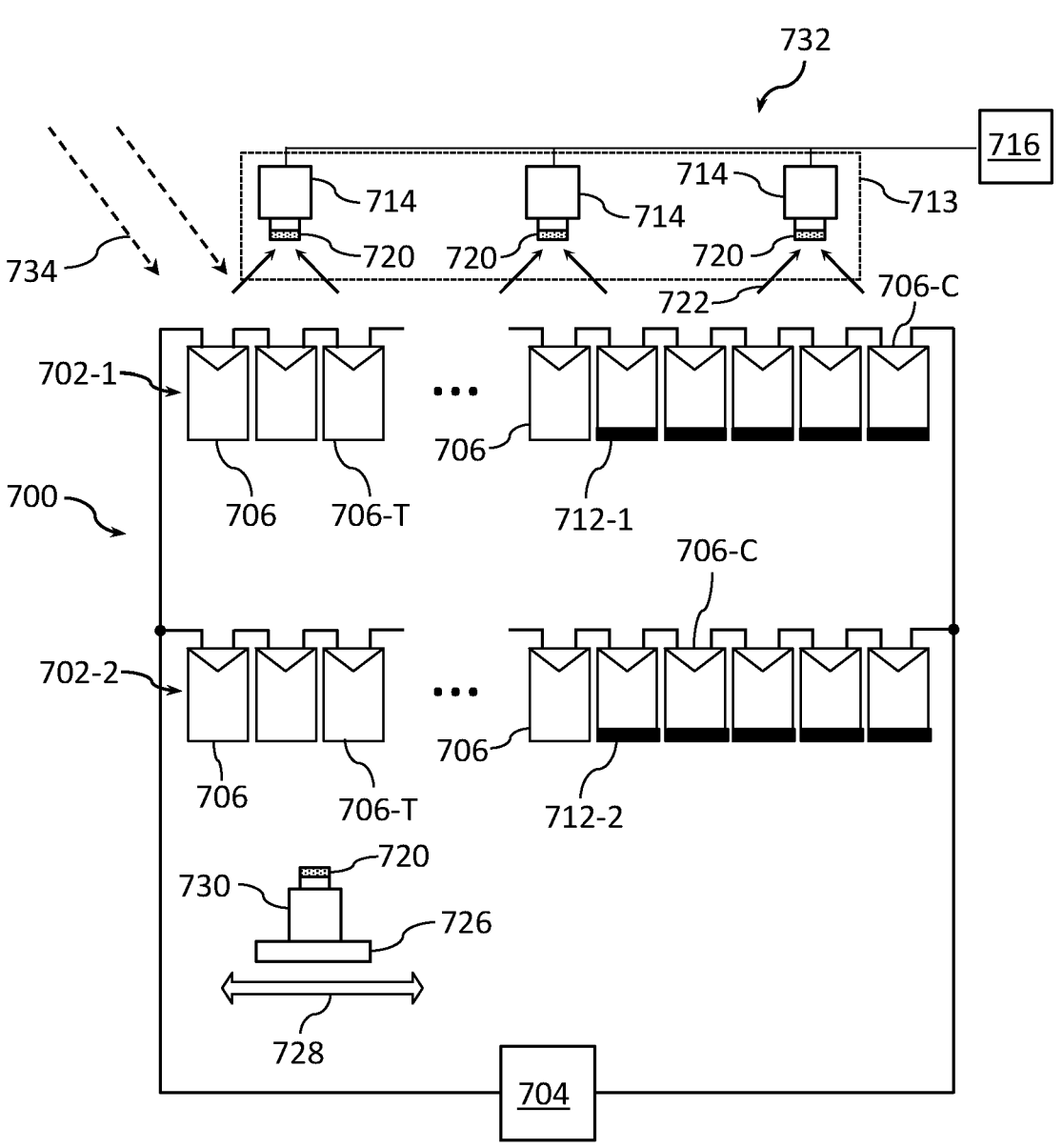
FIG. 7 shows in schematic form a photovoltaic array comprising two parallel-connected strings of photovoltaic modules, and an apparatus for determining data indicative of a PL response from one or more photovoltaic modules in the array under solar irradiation, according to an embodiment of the present invention.

FIG. 7 shows in schematic form a photovoltaic array 700 comprising only two module strings 702-1, 702-2 connected in parallel to an inverter 704. FIG. 7 also depicts an apparatus 732 comprising optical modulators 712-1, 712-2, a measurement system 713 and a computer 716 for inducing, measuring and processing signals 722 to determine data indicative of a photoluminescence response to solar irradiation 734 of at least one photovoltaic module 706 in the array. In the illustrated embodiment up to five of the, say, twenty-eight modules in each string 702-1, 702-2 are designated as control modules 706-C, fitted with optical modulators 712-1, 712-2 that may comprise switchable LEDs or manually operated or automated mechanical shutters as described previously. The other modules in each string 702-1, 702-2 are designated as test modules 706-T. If the modulators 712-1, 712-2 are configured such that their effects on the operating points of the two strings 702-1 and 702-2 are substantially equal, then the total current delivered to the inverter 704 during a testing procedure will remain substantially constant if the two strings 702-1, 702-2 are modulated alternately, i.e. in anti-correlation. In certain embodiments this is achieved by applying equal modulations to the same number of control modules 706-C, or more generally the same number of sub-strings in the control modules, in each string 702-1, 702-2. For example, in a first epoch of an inspection process five control modules 706-C in a first string 702-1 of twenty-eight modules 706 are bypassed by switching off the LEDs in a first set of modulators 712-1, while the second string 702-2 operates normally with the LEDs in a second set of modulators 712-2 on the respective control modules 706-C switched on. In a second epoch the situation is reversed, with five control modules 706-C in the second string 702-2 of twenty-eight modules bypassed and the first string 702-1 operating normally. Synchronisation of the two sets of optical modulators 712-1, 712-2 may be achieved by wired or wireless means. Other schemes for equalising the modulation effects on two or more strings of modules, using different combinations of control modules and modulated operating points, can be envisaged.

Similar to the larger scale embodiment depicted in FIG. 3, in the embodiment illustrated in FIG. 7 the measurement system 713 is in the form of one or more cameras 714 with appropriate fields of view for acquiring images of one or more test or control modules 706-T, 706-C in either or both strings 702-1, 702-2 as the operating points of the modules are modulated via the optical modulators 712-1, 712-2, for processing in the computer 716. The cameras 714 may be fitted with suitable bandpass filters 720 designed to pass the PL emitted by the cells of the modules 706-T, 706-C while excluding or reducing solar radiation outside the luminescence band(s). In an alternative embodiment images of one or more test or control modules 706-T, 706-C are acquired with a camera 730 with an appropriately high frame rate mounted on a moveable platform 726 such as an autonomous or human operated vehicle configured to travel 728 alongside a module string 702-1, 702-2 as the operating points of the modules 706-T, 706-C are modulated. In this case it may be convenient for the camera 730 to be connected to the computer 716 by wireless means. The platform 726 may for example be configured to move on physical rails or under various guidance systems known in the art of autonomous vehicles, e.g. to maintain a controlled working distance from the modules 706-T, 706-C. Alternatively, the moveable platform 726 could be an airborne moveable platform such as a drone. Images of modules 306-T, 306-C in the much larger photovoltaic array 300 depicted in FIG. 3 could also be acquired with a camera mounted on a ground-based or airborne moveable platform such as an autonomous vehicle or a drone.

The alternate or anti-correlated modulation principle depicted in FIG. 7 can be extended to photovoltaic arrays with three or more parallel-connected module strings, with a selected number of control modules in each string fitted for testing purposes with optical modulators, enabling the string modulation to be applied sequentially to each string in turn without affecting the overall current delivered by the array. Any number of pairs of strings could be modulated in anti-correlated fashion without affecting the overall current delivered by the array, if the respective optical modulators are configured and operated appropriately as described previously.

In the foregoing example embodiments the string modulation method has been applied to determining, from at least one module in a string, data indicative of a photoluminescence response to solar irradiation, and in particular an image of photoluminescence emitted from the at least one module. However other types of response may also be measured or investigated. In one example a response in the form of a change in current could be measured with one or more current measuring devices, such as current clamps that measure current by detecting the associated magnetic field, attached to one or more points in one or more modules in the string, such as a cell busbar, a cell interconnector, a module interconnector or a BPD connection. Measured current data may for example be used to perform a contactless current-voltage (I-V) curve measurement of a string under test. In one example implementation the illumination intensity incident on an increasing number of sub-strings in selected control modules can be varied and the string current measured repeatedly with a magnetic current sensing device to obtain, say, fifteen points along the I-V curve of the string, followed by interpolation if required to yield a smooth curve. Another useful implementation may be to convert PL signals of individual test modules or cells in the test modules to implied voltages to investigate the current-voltage characteristics of that module or cell.

In another example a response in the form of a change in temperature or the appearance of hot spots at one or more positions in a module string could be measured with one or more ground-based or airborne thermal infrared cameras, essentially using the optical modulation of the operating point for lock-in thermography.

A significant advantage of the described string modulation methods over the existing OMPL method is a large increase in inspection throughput. This is because the effect of the optical modulation is not localised to the module being selectively shaded, but instead extends to all modules in a string, including the control modules. This 'global' effect is a consequence of the optical modulation being applied to a subset of modules 306-C in a first string that is connected in parallel with a number of other strings to an inverter 304, which forces the remaining modules 306-T in the first string to adjust their voltage to compensate for the loss of voltage from the subset of modules 306-C. In the modelling and imaging results discussed above with respect to FIGS. 4 and 5, modulating the incident light intensity on selected portions of just five of twenty-eight modules in a typical string enables full area PL imaging of the remaining twenty-three modules if the full MPP to OC contrast in PL is required, or less than five if a lower range of modulation is sufficient to discriminate the PL signal from ambient light. The required images can usually be acquired and processed in a matter of seconds, so that the inspection throughput is generally limited by the time required to place the optical modulators.

In one example calculation, with twenty-eight 350 Wp modules per string and allowing two minutes to place the modulators on the selected control modules, an inspection throughput of around 295 kWp per hour is achievable, an approximately fourteen-fold improvement over the 21 kWp per hour estimate for the OMPL method described in the Background section. This example calculation includes all twenty-eight modules in the string, i.e. including the unshaded portions of the control modules. FIG. 5 shows that all cells in the control modules 502, with the exception of those few cells obscured by the modulators 504, can also be imaged at the same time as the test modules 506. These remaining cells could be imaged by repeating the process with the modulators 504 moved onto other cells in the same control modules or onto other modules in the string. However in many situations, especially for inspection protocols that require measurement of a statistically significant or predefined fraction of modules in an installation, the few obscured cells will be of little consequence. If necessary a different set of control modules or cells within control modules could be selected in a subsequent periodic inspection to ensure that every cell is imaged in at least every second inspection event. It may also be acceptable to miss a few cells if the selected control modules are at the low voltage end of the string where the effects of potential induced degradation (PID) are likely to be minimal. In another example application the string modulation method may be used for rapid pre-screening of strings prior to deciding if some photovoltaic modules require a more detailed inspection using any known technique including PL imaging.

Table 2 and FIG. 4 show that the dependence of the string current on the number of bypassed modules is non-linear, with the fourth bypassed module having the greatest relative effect followed by the fifth and third bypassed modules. Because reduction in string current is approximately equivalent to an increase in PL intensity, this means that the third, fourth and fifth bypassed modules have a greater influence on the PL signal. Basically, the differential PL signal between two operating points is larger when the operating points are on the steeper part of the I-V curve, closer to OC.

With this in mind, FIG. 8A shows in schematic form an apparatus 810 for determining data indicative of a photoluminescence response to solar irradiation 808 of at least one photovoltaic module 806 in a first string 802-1 of series-connected photovoltaic modules 806 that is one of a plurality of strings 802-1, 802-2 . . . 802-n of modules 806 connected in parallel to an inverter 804. In this embodiment the apparatus 810 comprises means 824 for fixedly shading selected portions of one or more other modules 806-B, referred to as bias modules, while the optical modulators 812 modulate the illumination intensity incident on selected portions of the one or more control modules 806-C. The shading means 824 could be identical in form to the optical modulators 812. e.g. LEDs in ambient light-blocking housings, manually operated or automated mechanical shutters, acousto-optic or electro-optic modulators or electrically-controlled LCDs, but simply not switched. Preferably, however, the shading means 824 is simple and inexpensive in form, comprising for example an appropriately sized sheet of opaque material, such as a piece of plywood or a rubber mat, that can be readily placed on a selected bias module 806-B. The shading means 824 may cover the entirety of the selected bias modules 806-B as shown, although it suffices to only cover a sufficient number of cells for the desired number of sub-strings in the bias modules 806-B to be bypassed, similar to the case with the control modules 806-C. As before, a measurement system 813 comprising for example one or more cameras 814 equipped with ambient light-reducing filters 820 measures, at first and second operating points induced by modulation of the illumination intensity incident on the one or more control modules 306-C, first and second signals 822 from each of one or more of the test modules 806-T or control modules 806-C, or from unshaded sub-strings in a bias module 806-B. The measured signals can then be processed in a computer 816 to determine data indicative of a photoluminescence response to solar irradiation of the one or more test modules 306-T or control modules 306-C.

It is also possible to use a combination of fixed shading and optical modulation on a single module with multiple sub-strings. For example FIG. 8B shows a control module 806-C with fixed shading means 824 applied to selected portions of two 'bias sub-strings' 826-B and an optical modulator 812 applied to a selected portion of a 'control sub-string' 826-C, while FIG. 8C shows a control module 806-C with fixed shading 824 applied to a selected portion of a 'bias' sub-string 826-B and an optical modulator 812 applied to a selected portion of a 'control' sub-string 826-C, leaving one 'test' sub-string 826-T with no shading. In general a given control module with multiple sub-strings can have any number of control, bias or test sub-strings as required.

In one example implementation, and with reference to Table 2, applying fixed shading to two bias modules 806-B will reduce the current in a twenty-eight module string 802-1 by about 17%, enabling the optical modulation of three control modules 806-C to modulate the string current, and therefore the PL signal, by about 78%. In another example, one could apply optical modulation to two control modules 806-C and fixed shading to seven or eight bias sub-strings 826-B to obtain about 70% modulation. In each case the achievable modulation should be more than sufficient to extract high quality PL image data from most if not all types of silicon-based photovoltaic module.

The combination of fixed shading and modulated shading on bias modules or control modules in a module string allows the toggling between a pair of operating points between MPP and OC, but with a smaller number of optical modulators. This can be advantageous in practice since it reduces the equipment required for testing and allows for faster movement of the optical modulation equipment between module strings. As explained previously the fixed shading means 824 can be very simple in form, such as a sheet of opaque material, and in many cases will be less expensive, less power hungry and easier to move and place than the optical modulators 812.

The number of control modules 306-C required to switch a string 302-1 in a photovoltaic array 300 to OC can alternatively be reduced by increasing the voltage on the inverter 304, e.g. under the control of the computer 316 or some other accessible interface. This will shift the operating point of the entire array 300 onto the steeper part of the I-V curve between MPP and OC, so that modulation of an individual control module 306-C has a greater effect on the operating point. It may therefore be possible, for example, to drive a string 302-1 of approximately twenty-eight modules to OC with only two or three control modules 306-C rather than four or five, representing a saving in equipment costs and an increase in inspection throughput. We note that the operating point response of a string 302-1 to an adjustment of the inverter 304 will generally be considerably slower than its response to an electronically controlled modulator 312 on a control module 306-C, e.g. 200 ms compared to a response time of around 1 ms or less for LED-based modulators.

As explained previously and shown in FIG. 5, applying optical modulation to selected control modules 306-C enables the imaging of PL from all modules 306 in a string. It is worth noting, however, that there are subtle differences between the PL responses of the control modules 306-C and the test modules 306-T. If the optical modulators 312 switch the illumination intensity incident on the selected cells of a control module 306-C fully between 1 Sun and zero, the non-shaded cells in that module will be switched between MPP and OC irrespective of the number of modules in the string. In contrast, and consistent with FIG. 4, the operating points of the test modules 306-T induced by modulation of the illumination intensity incident on the selected cells of the control modules 306-C will depend on the relative numbers of control modules and test modules 306-C, 306-T and on the selected illumination intensities. For example, if just one control module 306-C is used in a string of twenty-eight modules, then the twenty-seven test modules 306-T will switch between MPP and an operating point close to MPP, with only a very small change in PL intensity, whereas if five control modules are used the twenty-three test modules can be switched between MPP and OC. This is significant because the choice of the two operating points enables particular cell or module defects, such as series resistance defects or carrier lifetime defects, to be either highlighted or suppressed in the resulting PL images. For example switching between MPP and OC operating points will result in a PL response that is essentially an open circuit PL image, suitable for identifying defects such as cracks or impurities that can be identified on the basis of carrier lifetime variations. On the other hand, switching between other pairs of operating points may enable the acquisition of a 'current extraction' style PL image that is suitable for revealing series resistance-related defects that hinder the extraction of photogenerated charge carriers and hence lead to resistive losses in the module. In one particular example, and with reference to FIG. 8A, applying 1 to zero Suns modulation to two control modules 806-C and full shading to three bias modules 806-B would toggle the operating point of a 28-module string 802-1 between OC and about 62% of string $I_{sc}$ current, which would be suitable for providing a PL image that shows series resistance effects.

In general, the measurement and processing of signals at more than two operating points can be expected to yield additional PL response data. In one particular example, spatially resolved signals could be acquired with the control module illumination intensity switched between 1 Sun, 0.5 Sun and zero and processed in various combinations to yield PL images that show different types of defects with less ambiguity than would be the case with just two operating points. Similarly, in specific measurement protocols it may be beneficial to select the number of control modules and illumination intensities in such a way that the PL images from the control modules 306-C and test modules 306-T respectively show different types of defects, with series resistance-related or carrier lifetime-related features suppressed or enhanced. While not providing all information on all modules 306 in a string 302-1, this would offer a rapid way to check for different defect types on a large sample set of modules in a photovoltaic array.

Comparing the responses of control modules 306-C and test modules 306-T in a string 302-1 to an optical modulation imposed on one or more control modules may yield other information of value. For example the PL response time of the test modules 306-T, as measured with a photodetector or a camera 314, is expected to be slower than that of the control modules 306-C because the string current will take some time to change. In another example, the 'on' light intensity in the modulators 312 could be decreased until a clear difference in PL signal is seen between the control and test modules 306-C, 306-T. At this stage the 'on' light intensity of the modulators 312 will be about MPP equivalent, potentially allowing the external quantum efficiency (EQE) of the control cells to be determined.

Another potential advantage of the present string modulation method over the existing OMPL method may be a significant or complete amelioration of the risk associated with a missing or OC-defective BPD identified in the above-mentioned IEA-PVPS T13-24:2021 report. This is because, as shown in FIG. 4, the string current can be driven effectively to zero when the control modules are selectively shaded, e.g. by switching the relevant LEDs off. With little or no current flowing in a string under test there should be no adverse consequence of a missing or OC-defective BPD.

Needless to say, when a control module is not shaded, e.g. when the relevant LEDs are switched on, the module BPDs are not activated.

From the foregoing it will be appreciated that the disclosed methods and apparatus are well-suited to outdoor PL imaging of photovoltaic arrays.

Although the invention has been described with reference to specific examples, it will be appreciated by those skilled in the art that the invention may be embodied in many other forms.

The claims defining the invention are as follows:

1. A method for determining data indicative of a response to solar irradiation of at least one photovoltaic module in a first string of series-connected photovoltaic modules, the first string being one of a plurality of strings of series-connected photovoltaic modules connected in parallel to an inverter and exposed to solar irradiation, the method comprising the steps of:
   (i) using one or more optical modulators to modulate an intensity of illumination incident on selected portions of one or more photovoltaic modules in the first string selected to be one or more control modules, other photovoltaic modules in the first string being test modules, thereby modulating the operating points of the test modules and the one or more control modules;
   (ii) detecting, using a measurement system, first and second signals from each of one or more of the test modules or control modules at first and second operating points induced by the modulation of the intensity of illumination incident on the one or more control modules; and
   (iii) processing, by a computing device, the measured first and second signals to determine data indicative of the response to the solar irradiation of the one or more test modules or control modules, wherein the processing comprises differencing or performing lock-in detection on the measured signals to separate the data from background data indicative of ambient light.

2. The method according to claim 1, wherein the response to the solar irradiation comprises a photoluminescence response.

3. The method according to claim 2, wherein step (ii) comprises measuring the first and second signals in spatially resolved fashion, such that the data indicative of the photoluminescence response comprises a photoluminescence image of the one or more test modules or control modules.

4. The method according to claim 1, wherein step (ii) comprises measuring first and second signals from each of two or more modules in the first string selected from the test modules or the one or more control modules.

5. The method according to claim 1, wherein step (ii) comprises measuring first and second signals from each of one or more test modules.

6. The method according to claim 5, wherein step (ii) comprises measuring first and second signals from all of the test modules.

7. The method according to claim 6, wherein step (ii) comprises measuring first and second signals from all of the test modules and from all of the control modules.

8. The method according to claim 1, wherein the first and second signals are measured by a detector mounted on a moving platform.

9. The method according to claim 1, wherein step (i) comprises modulating the intensity of illumination incident on selected portions of a plurality of control modules such that the operating point of the test modules is modulated between approximately the maximum power point and open circuit.

10. The method according to claim 1, further comprising the step of measuring a phase delay between the modulation of the illumination intensity and the data indicative of the response.

11. The method according to claim 1, wherein the number of control modules or the magnitude of the modulation of the incident illumination intensity is selected such that an operating point resulting from the modulation of the incident illumination intensity is different for the test modules than for the one or more control modules.

12. The method according to claim 11, further comprising the step of comparing a response from a test module to a response from a control module.

13. The method according to claim 1, wherein step (i) further comprises modulating an intensity of illumination incident on selected portions of one or more selected control modules in a second string of series-connected photovoltaic modules in anti-correlation with the modulation of the intensity of illumination incident on selected portions of the one or more control modules in the first string.

14. The method according to claim 13, wherein the modulated operating points of the first and second strings are selected such that the total current delivered to the inverter remains substantially constant.

15. The method according to claim 1, further comprising the step of shading selected portions of one or more photovoltaic modules in the first string selected to be bias modules, while modulating the intensity of illumination incident on selected portions of the one or more control modules in the first string.

16. The method according to claim 1, further comprising the step of shading selected portions of one or more control modules in the first string, while modulating the intensity of illumination incident on selected portions of the one or more control modules in the first string.

17. The method according to claim 1, further comprising the step of varying the inverter voltage so as to shift the operating point of all of the parallel-connected strings.

18. The method according to claim 1, wherein step (ii) comprises measuring one or more additional signals from each of one or more of the test modules or control modules at one or more additional operating points induced by the modulation of the intensity of illumination incident on the one or more control modules, and step (iii) comprises processing the measured additional signals to determine additional data indicative of the response to solar irradiation of the one or more test modules or control modules.

19. An article of manufacture comprising a non-transitory computer readable medium having a computer readable program code configured to implement at least step (iii) of the method according to claim 1.

20. An apparatus for determining data indicative of a response to solar irradiation of at least one photovoltaic module in a first string of series-connected photovoltaic modules, the first string being one of a plurality of strings of series-connected photovoltaic modules connected in parallel to an inverter and exposed to solar irradiation, the apparatus comprising:
   (i) one or more optical modulators for modulating an intensity of illumination incident on selected portions of one or more photovoltaic modules in the first string selected to be one or more control modules, other photovoltaic modules in the first string being test modules, thereby modulating the operating points of the test modules and the one or more control modules;

(ii) a measurement system for measuring, at first and second operating points induced by the modulation of the intensity of illumination incident on the one or more control modules, first and second signals from each of one or more of the test modules or control modules; and (iii) a computer for processing the measured first and second signals to determine data indicative of a response to solar irradiation of the one or more test modules or control modules, wherein the processing comprises differencing or performing lock-in detection on the measured signals to separate the data from background data indicative of ambient light.

21. The apparatus according to claim 20, wherein the measurement system comprises one or more detectors sensitive to photoluminescence emitted from the one or more test modules or control modules in response to the solar irradiation.

22. The apparatus according to claim 21, wherein the measurement system comprises one or more cameras for measuring the first and second signals in spatially resolved fashion, such that the data indicative of the response comprises a photoluminescence image of the one or more test modules or control modules.

23. The apparatus according to claim 20, wherein the measurement system is configured to measure first and second signals from each of two or more modules in the first string selected from the test modules or the one or more control modules.

24. The apparatus according to claim 20, wherein the measurement system is configured to measure first and second signals from each of one or more test modules.

25. The apparatus according to claim 20, wherein the measurement system is configured to measure first and second signals from all of the test modules.

26. The apparatus according to claim 25, wherein the measurement system is configured to measure first and second signals from all of the test modules and from all of the control modules.

27. The apparatus according to claim 20, wherein the measurement system is mounted on a moveable platform.

28. The apparatus according to claim 20, wherein the one or more optical modulators are configured to modulate the intensity of illumination incident on selected portions of a plurality of control modules such that the operating point of the test modules is modulated between approximately the maximum power point and open circuit.

29. The apparatus according to claim 20, wherein the computer is configured to measure a phase delay between the modulation of the illumination intensity and the data indicative of the response.

30. The apparatus according to claim 20, wherein the one or more optical modulators are configured such that the number of control modules or the magnitude of the modulation of the incident illumination intensity is selected such that an operating point resulting from the modulation of the incident illumination intensity is different for the test modules than for the one or more control modules.

31. The apparatus according to claim 30, wherein the computer is configured to compare a response from a test module to a response from a control module.

32. The apparatus according to claim 20, further comprising one or more optical modulators for modulating an intensity of illumination incident on selected portions of one or more selected control modules in a second string of series-connected photovoltaic modules in anti-correlation with the modulation of the intensity of illumination incident on selected portions of the one or more control modules in the first string.

33. The apparatus according to claim 32, wherein the optical modulators on the control modules in the first string and the second string are configured such that, in use, the total current delivered to the inverter remains substantially constant.

34. The apparatus according to claim 20, further comprising means for shading selected portions of one or more photovoltaic modules in the first string selected to be bias modules, while the intensity of illumination incident on selected portions of the one or more control modules in the first string is being modulated.

35. The apparatus according to claim 20, further comprising means for shading selected portions of one or more control modules in the first string, while modulating the intensity of illumination incident on selected portions of the one or more control modules in the first string.

36. The apparatus according to claim 20, wherein the computer is configured to vary the inverter voltage so as to shift the operating point of all of the parallel-connected strings.

37. The apparatus according to claim 20, wherein the measurement system is configured to measure one or more additional signals from each of one or more of the test modules or control modules at one or more additional operating points induced by the modulation of the intensity of illumination incident on the one or more control modules, and the computer is configured to process the measured additional signals to determine additional data indicative of the response to solar irradiation of the one or more test modules or control modules.

38. An article of manufacture comprising a non-transitory computer readable medium having a computer readable program code configured to operate the apparatus according to claim 20.

* * * * *